(12) United States Patent
Lee et al.

(10) Patent No.: US 8,310,759 B2
(45) Date of Patent: Nov. 13, 2012

(54) DIFFUSING FILM HAVING MICRO LENS PATTERN AND EMBOSSED PATTERN

(75) Inventors: Jin Woo Lee, Uiwang-si (KR); Gyu Chan Cho, Uiwang-si (KR); Jong Kwan Kim, Uiwang-si (KR); Jae Goo Doh, Uiwang-si (KR)

(73) Assignee: Cheil Industries, Inc., Gumi-si, Gyeongsangbuk-do (KR)

( * ) Notice: Subject to any disclaimer, the term of this patent is extended or adjusted under 35 U.S.C. 154(b) by 0 days.

(21) Appl. No.: 13/050,412

(22) Filed: Mar. 17, 2011

(65) Prior Publication Data

US 2011/0164321 A1    Jul. 7, 2011

Related U.S. Application Data (63) Continuation of application No. PCT/KR2008/007783, filed on Dec. 30, 2008.

(30) Foreign Application Priority Data

Sep. 18, 2008   (KR) ................ 10-2008-0091789

(51) Int. Cl.
*G02B 13/20* (2006.01)
*G02B 5/02* (2006.01)

(52) U.S. Cl. ........................... 359/599; 359/601

(58) Field of Classification Search ............. 359/599, 359/601–613, 831; 599/599, 601–613, 831
See application file for complete search history.

(56) References Cited

U.S. PATENT DOCUMENTS

| | | | |
|---|---|---|---|
| 7,227,685 B2* | 6/2007 | Umemoto et al. | 359/489.06 |
| 7,408,708 B2* | 8/2008 | Goto et al. | 359/456 |
| 2006/0239028 A1* | 10/2006 | Yao et al. | 362/606 |
| 2007/0291386 A1* | 12/2007 | Yoshikawa et al. | 359/885 |
| 2008/0049165 A1* | 2/2008 | Min et al. | 349/64 |
| 2010/0110331 A1* | 5/2010 | Han et al. | 349/62 |

FOREIGN PATENT DOCUMENTS

| | | |
|---|---|---|
| JP | 2004-309557 A | 11/2004 |
| KR | 2007-0044095 A | 4/2007 |
| KR | 2007-0100535 A | 10/2007 |
| KR | 10-0796479 B1 | 1/2008 |

* cited by examiner

*Primary Examiner* — Thong Nguyen
(74) *Attorney, Agent, or Firm* — Lee & Morse, P.C.

(57) ABSTRACT

A diffusing film may have a microlens pattern and an embossed pattern on the surface thereof. The diffusing film includes a light entrance plane for receiving incident light, a light exit plane opposite the light entrance plane, the light exit plane for transmitting light, a plurality of microlenses on a surface of the light exit plane of the diffusing film, microlenses of the plurality of microlenses being spaced apart from one another, and a separation plane between the plurality of microlenses, the separation plane having an embossed pattern on a surface thereof.

19 Claims, 5 Drawing Sheets

DIFFUSING FILM HAVING MICRO LENS PATTERN AND EMBOSSED PATTERN

CROSS-REFERENCE TO RELATED APPLICATION

This application is a continuation of pending International Application No. PCT/KR2008/007783, entitled "Diffusing Film Having Micro Lens Pattern and Embossed Pattern," which was filed on Dec. 30, 2008, the entire contents of which are hereby incorporated by reference.

BACKGROUND

1. Field

Embodiments relate to an optical film for use in a backlight unit, and more particularly to a diffusing film having a microlenses arranged in an embossed pattern on the surface thereof.

2. Description of the Related Art

Generally, display systems, e.g., liquid crystal displays, using backlight units for illumination include plural optical films which serve to concentrate or diffuse light output from a light source, e.g., a light guide, within a backlight unit.

In recent years, interest in optical films having improved brightness through enhancement of light utilization efficiency has gradually increased in the related art. A diffusing film refers to any kind of component that can be used to increase the uniformity of the intensity distribution of light to a viewer while maintaining total luminous transmittance. In particular, diffusing films disguise the structure of the light source being used and smooth the intensity distribution output form the light source.

Such diffusing films are applied to displays used in a wide variety of applications, e.g., vehicle navigation systems, mobile phones, PDAs, notebook computers, monitors for desktop computers, TVs, and the like.

SUMMARY

According to embodiments, a diffusing film may include a light entrance plane receiving incident light, a light exit plane, opposite the light entrance plane, the light exit plane transmitting light, a plurality of microlenses on a surface of the light exit plane of the diffusing film, microlenses of the plurality of microlenses being spaced apart from one another, and a separation plane between the plurality of microlenses, the separation plane having an embossed pattern on a surface thereof.

The embossed pattern may be integral with the separation plane of the diffusing film.

The microlenses may be arranged to constitute triangular lattices around a central microlens.

The triangular lattices may be equilateral triangular lattices.

Each microlens of the plurality of microlenses may have a same diameter.

Microlenses of the plurality of microlenses may be arranged in an irregular pattern.

The embossed pattern on the separation plane may have an Ra of about 0.5~3 μm and an HDI of about 3~8 μm.

The microlenses may be spaced apart by about 1~20 μm.

Each microlens may be hemi-spherical and may have a diameter between about 20~200 μm.

Each microlens may have an H/R ratio of about 0.5~1.2.

Microlenses of the plurality of microlenses may have varying diameters within a range of about 20~200 μm and/or may be spaced apart by varying widths within a range of about 1~20 μm.

The diffusing film may be made of methacrylate resin, styrene resin, cycloolefin resin, polycarbonate resin, or a combination thereof.

The light entrance plane may have an embossed pattern on a surface thereof.

The embossed pattern may be integral with the surface of the light entrance plane of the diffusing film.

The embossed pattern on the light entrance plane may have an Ra of about 0.5~3 μm and an HDI of about 3~8 μm.

According to embodiments a method of manufacturing a diffusing film, may include preparing a light exit plane roll and a light entrance plane roll, the light exit plane roll having a surface corresponding to an inverse image of a plurality of microlenses on a surface of the light exit plane of the diffusing film, inverse images of microlenses of the plurality of microlenses being spaced apart from one another, forming a melt film by extruding a transparent polymer resin melt, transferring a pattern to the melt film by passing the melt film between the light exit plane roll and the light entrance plane roll, cooling the melt film having the pattern transferred thereto, and forming an embossed pattern between the plurality of microlenses on the light exit plane.

Forming the embossed pattern may include preparing the light exit plane roll to have an inverse image of the embossed pattern between the inverse images of the plurality of microlenses.

The transparent polymer resin may have a melt index (MI) in the range of 5~100 at 250° C. and 10 kgf.

The melt film may have a thickness of about 100~500 μm.

The light entrance plane roll may have a mirror surface.

The light entrance plane roll may have an inverse image of an embossed pattern.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2008-0091789, filed on Sep. 18, 2008, in the Korean Intellectual Property Office, and entitled: "Diffusing Film Having Micro Lens Pattern and Embossed Pattern," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
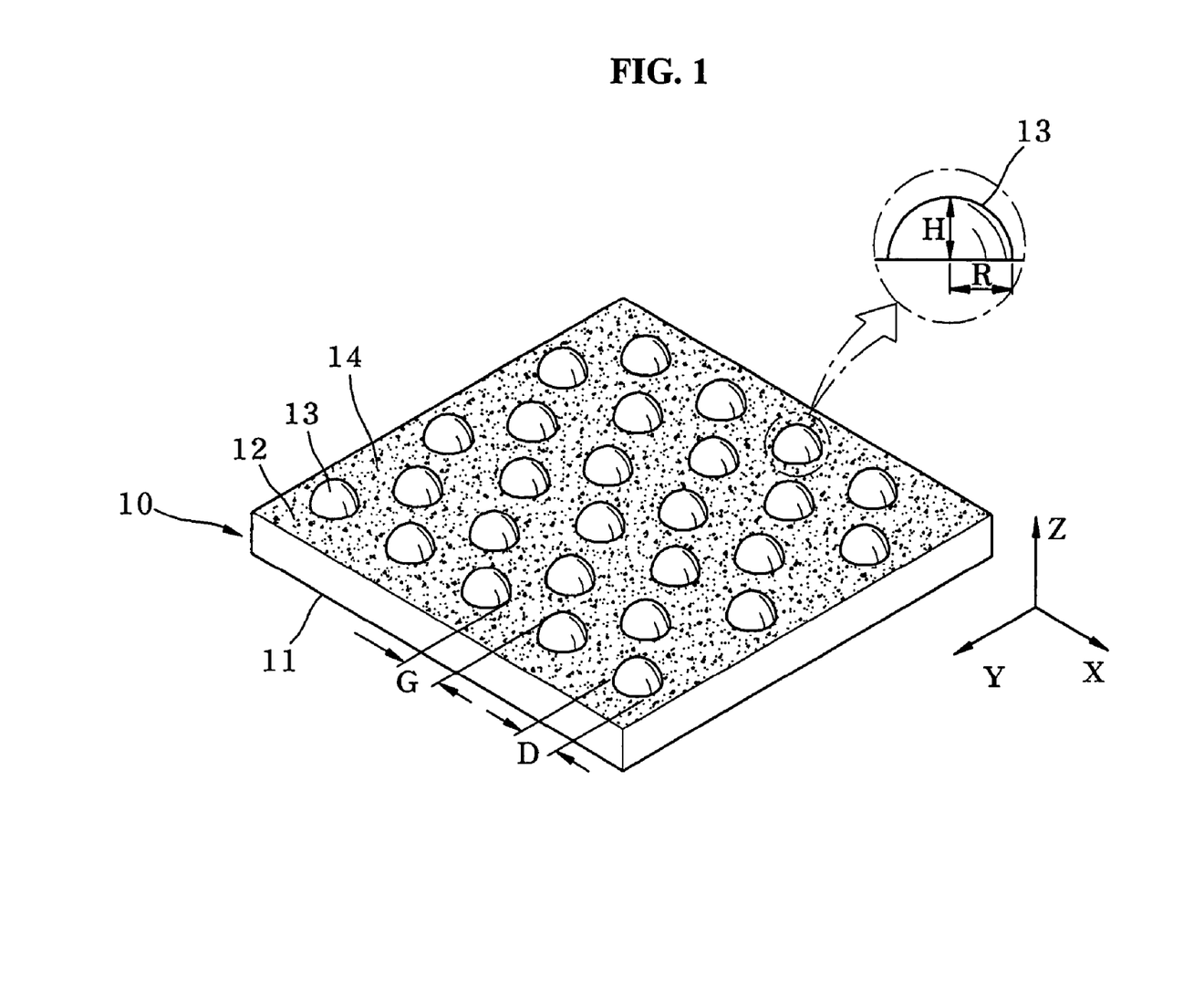
FIG. 1 illustrates a perspective view of a diffusing film according to a first embodiment.

FIG. 1 illustrates a perspective view of a diffusing film according to a first embodiment. As shown in FIG. 1, a diffusing film 10 according to the first embodiment has a light entrance plane 11, which receives incident light, and a light exit plane 12, opposite the light entrance plane 11, which transmits light. The light exit plane 12 may be arranged to face a display to be illuminated and the light entrance plane may be arranged to face a light source to illuminate the display.

The light exit plane 12 has microlenses 13, e.g., hemispherical microlenses, arranged on the surface thereof. The microlenses 13 focus light incident thereon to provide a light concentration effect to the diffusing film 10. The microlenses 13 may be arranged in a regular pattern on the surface of the light exit plane 12. The microlenses 13 may be spaced from one another by a separation plane 14 such that the surface of the light exit plane is exposed. For example, as shown in FIG. 1, the microlenses 13 may be arranged to constitute triangular lattices around a central microlens, with the separation plane 14 therebetween. In particular, as shown in FIG. 1, the microlenses 13 may be arranged to constitute equilateral triangular lattices having same orientation along a column in a y-direction, with adjacent columns having opposite orientations.

In an implementation, as shown in FIG. 1, the microlenses 13 may be arranged in rows, i.e., linearly along an x-direction. The rows may be regular, e.g., separated by a width G, along the x-direction. Adjacent rows may also be space apart by the width G. Microlenses 13 in rows adjacent one another along the y-direction may be offset relative to one another. For example as shown in FIG. 1, microlenses 13 in adjacent lines may be shifted by half of the pitch of the row. Where the lenses have a same diameter D, the pitch will be G+D. In an implementation, only if there is sufficient room for an entire microlens 13 along the x-direction will there be microlens 13 in the row. Thus, as shown in FIG. 1, different rows may have different numbers of microlenses 13.

The diameter D of each microlens 13 may be about 20~200 μm. When a diameter of the microlens 13 is within this range, excessive influence of individual microlenses, unfavorable conditions for forming microlenses over a large area, and other disadvantages in terms of manufacturing techniques and costs may be avoided. Further, when the microlenses 13 have a diameter within this range, a thickness of the diffusing film 10, brightness variation leading to quality deterioration, and Moiré phenomenon between the diffusing film and a display to be illuminated may be decreased.

The microlens 13 may have a ratio of height H to radius R of curvature, i.e., an H/R ratio, in the range of about 0.5~1.2. When the H/R ratio is within this range, the diffusing film will concentrate light within an optimal light concentration range, thereby maintaining brightness.

The width G of the separation plane 14 between microlenses 13 along the x-direction may be about 1~20 μm. Having the width G within this range may provide numerous advantages. For example, having the width G within this range may avoid or reduce a spreading defect between the microlenses 13 during manufacture of a film sheet. The spreading defect may lead to brightness deterioration and a reduction in lifespan of a light exit plane roll, which may be used for transferring the pattern of microlenses 13, as discussed in detail below. Having the width G within this range may also result in the microlenses occupying a sufficient area to maintain light concentration efficiency and, thus, brightness.

Figure 2:
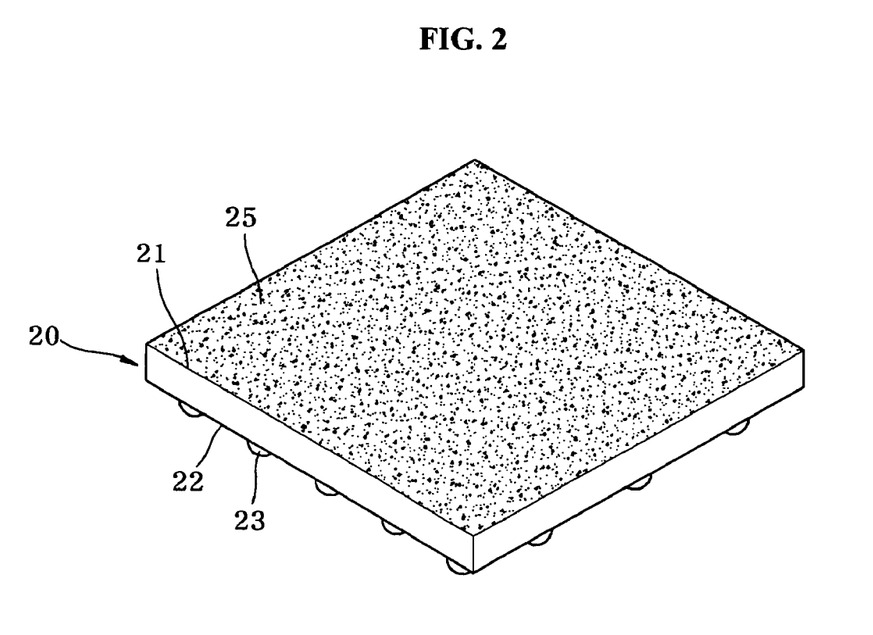
FIG. 2 illustrates a rear perspective view of a diffusing film according to a second embodiment.

FIG. 2 illustrates a rear perspective view of a diffusing film 20 according to a second embodiment. The diffusing film 20 according to the second embodiment includes a light exit plane 22, which has the same configuration as the light exit plane 12 of the first embodiment, and a light entrance plane 21 that has an embossed pattern 25 over the surface thereof. The diffusing film 20 may also include microlenses 23.

The embossed pattern 25 serves to diffuse light incident on the light entrance plane 21. The embossed pattern 25 on the surface of the light entrance plane 21 may have a surface roughness Ra of about 0.5~3 μm and a height distribution index HDI of about 3~8 μm. If Ra and HDI are within these ranges, uniform diffusion of light may be readily obtained, total luminous transmittance may be maintained, and partial variation of luminous transmittance on the diffusing film may be avoided.

The diffusing film according to the first and second embodiments may be formed of a transparent thermoplastic polymer resin. Specifically, the diffusing film may be formed of a thermoplastic resin, e.g., methacrylate resin, styrene resin, cycloolefin resin, polycarbonate resin, or a combination thereof.

Figure 3:
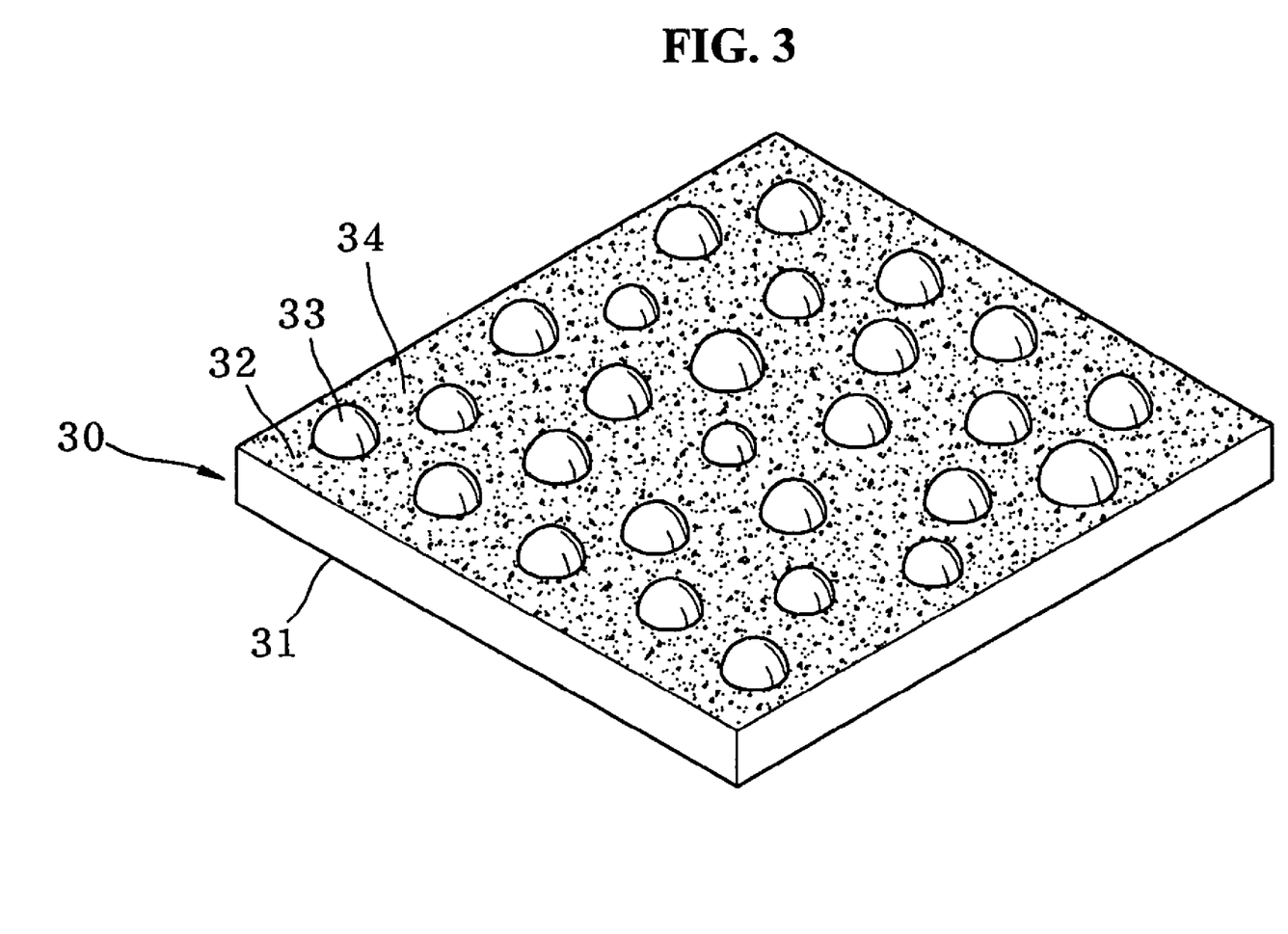
FIG. 3 illustrates a perspective view of a diffusing film according to a third embodiment.

FIG. 3 illustrates a perspective view of a diffusing film 30 according to a third embodiment. According to the third embodiment, the diffusing film 30 has a plurality of microlenses 33, which have non-uniform diameters within a range of about 20~200 μm and/or are arranged to have non-uniform spacing within a range of 1~20 μm between the microlenses 33. This arrangement of the microlenses may reduce or prevent interference or Moiré phenomenon, which may arise when the same microlens is arranged in a regular pattern. The microlenses 33 may still be hemi-spherical, but have varying diameters. The diffusing film 30 may also include a light entrance plane 31, a light exit plane 32, and a separation plane 34.

Figure 4:
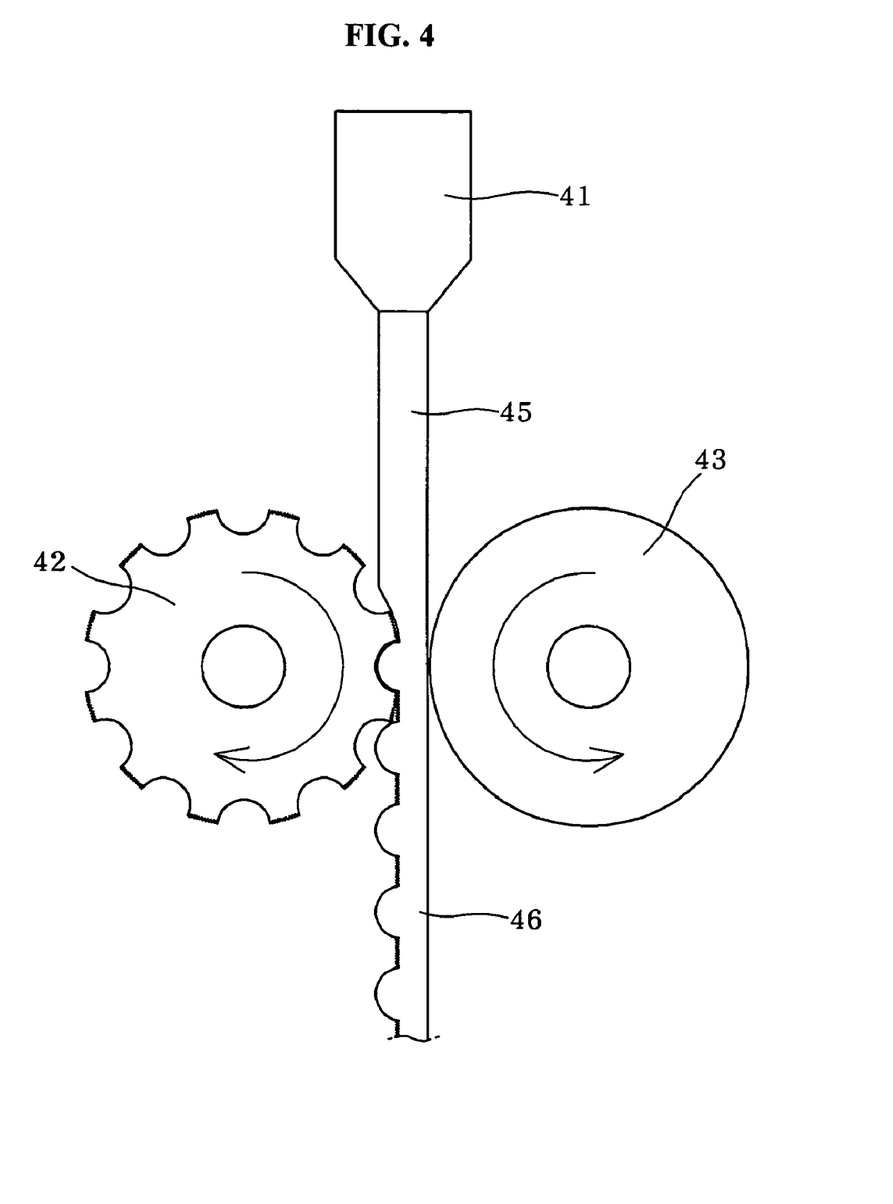
FIG. 4 illustrates a schematic view of a method of manufacturing a diffusing film according to a fourth embodiment.

FIG. 4 illustrates a schematic view of a method of manufacturing a diffusing film according to a fourth embodiment. As shown in FIG. 4, the method of manufacturing a diffusing film includes preparing a light exit plane roll 42, which has an inverse of an image of a microlens pattern on the surface thereof, and a light entrance plane roll 43, which has a mirror smooth surface. A melt film 45 may be formed by extruding a transparent polymer resin melt from a die 41. Patterns may be transferred to the melt film 45 by passing the melt film 45 between the light exit plane roll 42 and the light entrance plane roll 43. An extruded melt film 46 having the patterns transferred thereto may be cooled to form the diffusing film.

The light exit plane roll may also have an inverse image of an embossed pattern on the surface thereof between the inverse image of the microlens pattern, such that the light exit plane roll 42 has an inverse image of the light exit plane to be formed. Next, a process of preparing the light exit plane roll 42 having the inverse image of both the microlens pattern and the embossed pattern will be described.

As described above with reference to FIG. 2, the embossed pattern is formed on the separation plane 14 to improve light efficiency. Thus, in preparation of the light exit plane roll 42, an inverse pattern of microlenses is formed on the surface of the light exit plane roll 42. The surface corresponding to the separation plane may be roughened, e.g., subjected to sandblasting, to form the embossed pattern on the separation plane 14.

In an implementation, after fabricating a roll having a predetermined microlens pattern by etching, the sand-blasting process may be performed as disclosed in Korean Patent Application No. 2007-0086601 and U.S. Patent Application Publication no. 2010/0151204 A1, which are hereby incorporated by reference in their entirety and for all purposes, so that the roll may have the embossed pattern on the separation plane between the microlenses. With the sand size and the process disclosed in this patent application, the embossed pattern can be properly formed only on the separation plane between the microlenses, which are previously formed on the surface of the light exit plane roll.

This process may used when the embossed pattern is integral with the separation plane. Alternatively, the embossed pattern may be separately formed on the separation plane by separately forming the embossed pattern and depositing the embossed pattern only on the separation plane.

In order to manufacture the diffusing film by a process of extruding a thermoplastic resin melt, the thermoplastic resin may have a melt index (MI) in the range of 5~100 at 250° C. and 10 kgf. Using a thermoplastic resin having a melt index within this range may insure the patterns of the roll can be properly transferred while allowing the thermoplastic resin to be extruded into a sheet shape.

Figure 5:
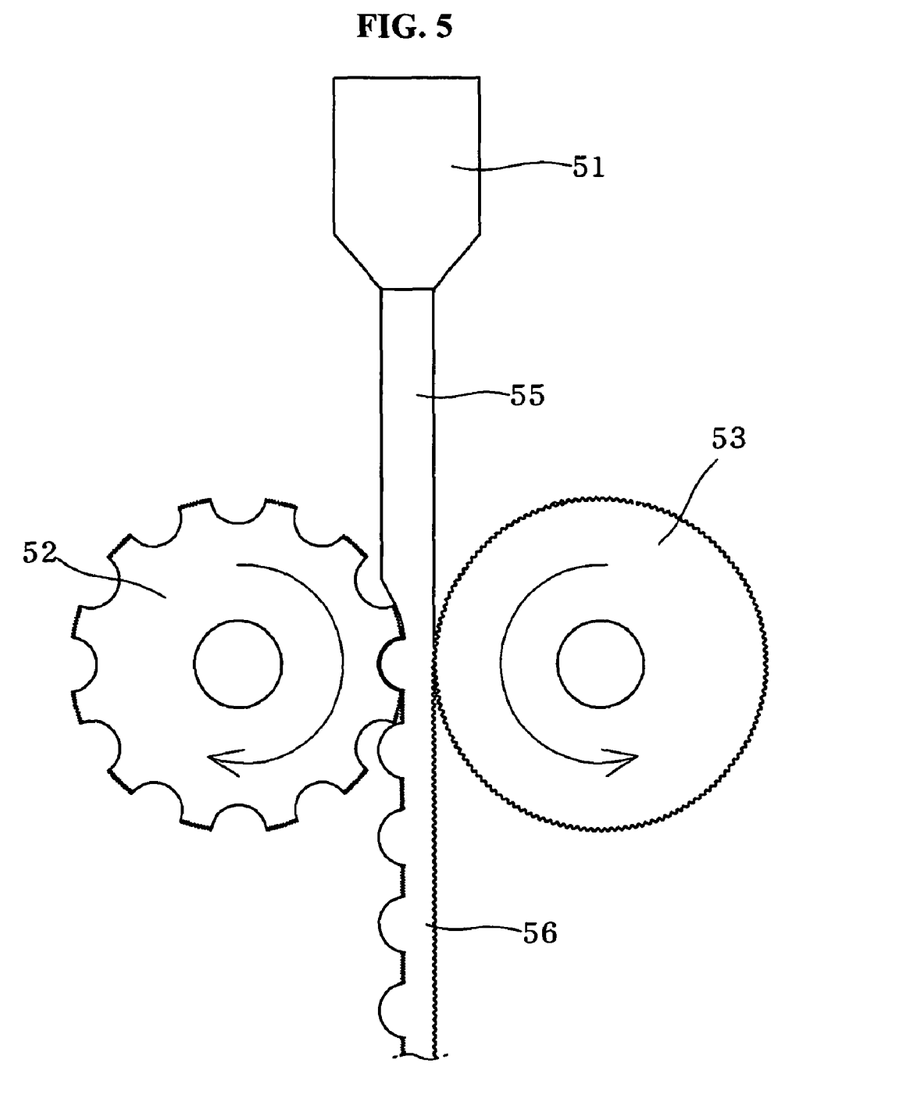
FIG. 5 illustrates a schematic view of a method of manufacturing a diffusing film according to a fifth embodiment.

FIG. 5 illustrates a schematic view of a method of manufacturing a diffusing film according to a fifth embodiment. As shown in FIG. 5, the method may include preparing a light exit plane roll 52 and a light entrance plane roll 53. A melt film 55 may be formed by extrusion via a die 51. An extruded melt film 56 having patterns transferred thereto may form the diffusing film.

The method according to the fifth embodiment is a method of manufacturing the diffusing film of the second embodiment. Accordingly, a roll pattern corresponding to an inverse image of the embossed pattern is formed on the surface of the light entrance plane to transfer the embossed pattern to the light entrance plane.

As in the fourth embodiment, the sand-blasting process may be performed as disclosed in Korean Patent Application No. 2007-0086601 and U.S. Patent Application Publication no. 2010/0151204 A1 to form the embossed pattern on the surface of the light entrance plane. At this time, the surface of the light entrance plane subjected to the sand-blasting process may have Ra of 0.5~3 μm and HDI of 3~8 μm. If Ra and HDI are within these ranges, uniform diffusion of light may be obtained, total luminous transmittance may be maintained, and partial variation of luminous transmittance on the diffusing film may be avoided.

Additionally, in this embodiment, the embossed pattern may be separately formed on the separation plane by separately forming the embossed pattern and depositing the embossed pattern only on the separation plane.

As described above, the diffusing film according to embodiments has hemi-spherical microlenses comparatively densely arranged on the surface thereof. In this regard, when the microlenses are arranged to constitute equilateral triangle lattices around a central microlens, it is possible to obtain the densest arrangement of the microlenses.

Further, in order to maximize light concentration and diffusion effects, an embossed pattern is formed on the separation plane between the microlenses. The embossed pattern can provide not only the light concentration and diffusion effects, but can also reduce or prevent the Moiré phenomenon, which can occur when the diffusing film overlaps other optical members. Further, the microlenses may have a random size, within a range, and be irregularly arranged, within a spacing range, to further reduce or prevent the Moiré phenomenon.

Next, embodiments will be described in terms of optical characteristics with Examples and Comparative Examples. The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

Example 1

A diffusing film of Example 1 was prepared by the method according to the fourth embodiment. Example 1 was formed of polycarbonate (Yarn SC-1220 available from Cheil Industries, Inc., Korea) using an unprocessed steel roll as the light entrance plane roll, and, as the light exit plane roll, a roll on which inverse images of a microlens pattern and an embossed pattern were formed by the method according to the fourth embodiment.

The microlenses have a size as shown in Table 1. With the diffusing film disposed on a diffuser sheet (DRE361 available from Cheil Industries, Inc., Korea), the brightness was measured using EZ-Contrast from Eldim Co., Ltd. Further, a light shielding degree, i.e., a haze index, was measured using NDH 5000W-Hazemeter available from Nippon Denshoku, Ltd.

Examples 2 and 3

Diffusing films according to the second and third embodiments were prepared by the method according to the fifth embodiment. A roll having an embossed pattern on the surface thereof was used as the light entrance plane roll. The embossed pattern was formed by the sand-blasting process as described above.

Comparative Example 1

In a diffusing film of Comparative Example 1, the light entrance plane was a mirror plane as in Example 1, and the light exit plane was formed with microlenses, which have the same size as that of Example 1. However, no embossed pattern was formed on a separation plane of the diffusing film.

Comparative Example 2

A diffusing film of Comparative Example 2 had the same specification as that of Example 2, except for an H/R ratio of 0.3. As a result, Comparative Example 2 had a lower brightness than Example 2.

Comparative Example 3

A diffusing film of this Comparative Example 3 had the same specification as that of Example 2 except for the surface condition (i.e. Ra and HDI) of the embossed pattern on the light entrance plane, as shown in Table 1. As a result, Comparative Example 3 had a lower brightness than Example 2.

Comparative Example 4

A diffusing film of Comparative Example 4 had the same specification as that of Example 2 except that the separation plane between the microlenses had a width of 30 μm. As a result, Comparative Example 4 had a lower brightness than Example 2.

TABLE 1

| | Light exit plane | | Light entrance plane | | Optical characteristics | |
|---|---|---|---|---|---|---|
| | Diameter (μm) | Emboss/ H/R | Width (μm) | Ra | HDI | Haze | Brightness (cd/m²) |
| Example 1 | 100 | 0.9 | Exist/10 | 0.0 | — | 85 | 9,250 |
| Example 2 | 100 | 0.9 | Exist/10 | 1.2 | 7 | 91 | 9,100 |
| Example 3 | 50 | 0.8 | Exist/10 | 1.8 | 10 | 92 | 9,050 |
| Comparative Example 1 | 100 | 0.9 | None/10 | 0.0 | — | 72 | 8,730 |
| Comparative Example 2 | 100 | 0.3 | Exist/10 | 1.2 | 7 | 90 | 7,500 |
| Comparative Example 3 | 100 | 0.9 | Exist/10 | 4.3 | 21 | 92 | 8,570 |
| Comparative Example 4 | 100 | 0.8 | Exist/30 | 1.2 | 7 | 91 | 8,620 |

As can be seen from Table 1, the inventive examples exhibited superior brightness to the comparative examples.

First, comparing Example 1 with Comparative Example 1, it can be seen that the formation of the embossed pattern on the separation plane resulted in increases of both haze and brightness.

Next, comparing Example 2 with Comparative Example 2, it can be seen that an H/R ratio outside the range of 0.5~1.2 in Comparative Example 2 resulted in brightness deterioration.

Comparing Example 2 with Comparative Example 3, it can be seen that the surface condition of the embossed pattern on the light entrance plane outside an Ra of 0.5~3 μm and an HDI of 3~8 μm in Comparative Example 3 resulted in brightness deterioration.

Comparing Example 2 with Comparative Example 4, it can be seen that a width of the separation plane exceeding 20 μm in Comparative Example 4 also resulted in brightness deterioration.

Conventionally, the diffusing film is fabricated by coating polystyrene beads or acryl beads on a substrate. In this case, the diffusing film must be subjected to a number of processes, which increases manufacturing costs. In contrast, according to embodiments set forth above, the diffusing film can be manufactured to have both functions of diffusing and concentrating light without a bead coating process. Furthermore, the diffusing film according to embodiments can lower power consumption and improve efficiency of a light source by realizing realization of a higher brightness diffusing film.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A diffusing film, comprising:
   a light entrance plane for receiving incident light;
   a light exit plane, opposite the light entrance plane, the light exit plane for transmitting light;
   a plurality of microlenses on a surface of the light exit plane of the diffusing film, microlenses of the plurality of microlenses being spaced apart from one another; and
   a separation plane between the plurality of microlenses, the separation plane having an embossed pattern on a surface thereof, the embossed pattern having a surface roughness of about 0.5~3 μm and a height distribution index of about 3~8 μm.

2. The diffusing film as claimed in claim 1, wherein the embossed pattern is integral with the separation plane of the diffusing film.

3. The diffusing film as claimed in claim 1, wherein the microlenses are arranged to constitute triangular lattices around a central microlens.

4. The diffusing film as claimed in claim 3, wherein the triangular lattices are equilateral triangular lattices and each microlens of the plurality of microlenses has a same diameter.

5. The diffusing film as claimed in claim 1, wherein microlenses of the plurality of microlenses are arranged in an irregular pattern.

6. The diffusing film as claimed in claim 1, wherein the microlenses are spaced apart by about 1~20 μm.

7. The diffusing film as claimed in claim 1, wherein each microlens is hemi-spherical and has a diameter between about 20~200 μm.

8. The diffusing film as claimed in claim 1, wherein each microlens has a height to radius of curvature ratio of about 0.5~1.2.

9. The diffusing film as claimed in claim 1, wherein microlenses of the plurality of microlenses have varying diameters within a range of about 20~200 μm and are spaced apart by varying widths within a range of about 1~20 μm.

10. The diffusing film as claimed in claim 1, wherein the diffusing film comprises a thermoplastic resin selected from methacrylate resin, styrene resin, cycloolefin resin, polycarbonate resin, or a combination thereof.

11. The diffusing film as claimed in claim 1, wherein the light entrance plane has an embossed pattern on a surface thereof.

12. The diffusing film as claimed in claim 11, wherein the embossed pattern on the surface of the light entrance plane is integral with the surface of the light entrance plane of the diffusing film.

13. A diffusing film, comprising:
   a light entrance plane for receiving incident light, the light entrance plane having an embossed pattern of the light entrance plane on a surface thereof, the embossed pattern of the light entrance plane being integral with the surface of the light entrance plane, and the embossed pattern on the surface of the light entrance plane having a surface roughness of about 0.5~3 μm and a height distribution index of about 3~8 μm;
   a light exit plane, opposite the light entrance plane, the light exit plane for transmitting light;
   a plurality of microlenses on a surface of the light exit plane of the diffusing film, microlenses of the plurality of microlenses being spaced apart from one another; and
   a separation plane between the plurality of microlenses, the separation plane having an embossed pattern of the separation plane on a surface thereof.

14. A method of manufacturing a diffusing film having a light entrance plane for receiving incident light and a light exit plane, opposite the light entrance plane, the light exit plane for transmitting light, the method comprising:

preparing a light exit plane roll and a light entrance plane roll, the light exit plane roll having a surface including a pattern corresponding to an inverse image of a plurality of microlenses to be formed spaced apart from one another on a surface of the light exit plane of the diffusing film, inverse images of microlenses of the plurality of microlenses being spaced apart from one another on the light exit plane roll;

transferring the pattern on the surface of the light exit plane roll and a pattern on a surface of the light entrance plane roll to a melt film;

the transferring the pattern on the surface of the light exit plane roll includes forming an embossed pattern on a separation plane between the plurality of microlenses, the embossed pattern being formed on the surface of light exit plane and having a surface roughness of about 0.5~3 μm and a height distribution index of about 3~8 μm.

15. The method as claimed in claim 14, wherein forming the embossed pattern includes preparing the light exit plane roll to have an inverse image of the embossed pattern between the inverse images of the plurality of microlenses.

16. The method as claimed in claim 14, wherein the melt film has a melt index (MI) in the range of about 5~100 at 250° C. and 10 kgf.

17. The method as claimed in claim 14, wherein the melt film has a thickness of about 100~500 μm.

18. The method as claimed in claim 14, wherein the light entrance plane roll has a mirror surface.

19. The method as claimed in claim 14, wherein the light entrance plane roll has an inverse image of an embossed pattern.

* * * * *